United States Patent
Imamura et al.

(10) Patent No.: US 12,195,589 B2
(45) Date of Patent: Jan. 14, 2025

(54) METHOD FOR PRODUCING POLYALKYLENE OXIDE

(71) Applicant: SUMITOMO SEIKA CHEMICALS CO., LTD., Hyogo (JP)

(72) Inventors: Yuika Imamura, Himeji (JP); Akira Kimura, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 17/944,371

(22) Filed: Sep. 14, 2022

(65) Prior Publication Data
US 2023/0082443 A1 Mar. 16, 2023

(30) Foreign Application Priority Data

Sep. 15, 2021 (JP) .................. 2021-150542

(51) Int. Cl.
| | | |
|---|---|---|
| *C08G 65/12* | (2006.01) | |
| *C08G 65/26* | (2006.01) | |
| *C08G 65/30* | (2006.01) | |
| *C08J 3/28* | (2006.01) | |
| *C08K 5/05* | (2006.01) | |

(52) U.S. Cl.
CPC ......... *C08G 65/12* (2013.01); *C08G 65/2609* (2013.01); *C08G 65/30* (2013.01); *C08J 3/28* (2013.01); *C08K 5/05* (2013.01); *C08G 2650/58* (2013.01)

(58) Field of Classification Search
CPC ............... C08G 65/12; C08G 2650/58; C08G 65/2609; C08G 65/30; C08J 3/28; C08K 5/05
See application file for complete search history.

(56) References Cited

U.S. PATENT DOCUMENTS 3,470,078 A * 9/1969 King .................. C08J 3/28
522/86
4,667,013 A 5/1987 Reichle

FOREIGN PATENT DOCUMENTS

JP 62-273227 A 11/1987

OTHER PUBLICATIONS

U.S. Appl. No. 17/944,416, filed Sep. 14, 2022 (Yuika Imamura, et al.).

* cited by examiner

*Primary Examiner* — Rabon A Sergent
(74) *Attorney, Agent, or Firm* — Sughrue Mion, PLLC

(57) ABSTRACT

A method for producing a polyalkylene oxide includes step 1 of performing a polymerization reaction of an alkylene oxide in the presence or absence of a chain transfer agent to obtain a high-molecular-weight polyalkylene oxide; and step 2 of irradiating the high-molecular-weight polyalkylene oxide obtained in step 1 with radiation to obtain a polyalkylene oxide, wherein the amount of the chain transfer agent when used is less than 300 mass ppm relative to the alkylene oxide, and the high-molecular-weight polyalkylene oxide obtained in step 1 has a viscosity at 25° C. in a 1 mass % aqueous solution of 7500 mPa·s or more.

6 Claims, No Drawings

METHOD FOR PRODUCING POLYALKYLENE OXIDE

TECHNICAL FIELD

The present disclosure relates to a method for producing a polyalkylene oxide.

BACKGROUND ART

Polyalkylene oxides have been applied in various applications because of their unique physical properties and low toxicity. For example, polyalkylene oxides are used for dispersion stabilizers, cosmetic additives, thickeners, raw materials for paper manufacturing, dosage form, ceramic binders, and battery materials. It can be said that polyalkylene oxides are materials whose use is extremely valuable.

Various methods for producing such polyalkylene oxides are known. In particular, polyalkylene oxides are materials whose physical properties vary according to their molecular weight, and production methods for precisely controlling their molecular weight have been widely studied. For example, Patent Literature 1 discloses a technique for producing a polyalkylene oxide with a controlled molecular weight by performing a polymerization reaction of an alkylene oxide in the presence of a chain transfer agent.

CITATION LIST

Patent Literature

PTL 1: 1987-273227A

SUMMARY OF INVENTION

Technical Problem

However, although a conventional method for producing a polyalkylene oxide can control molecular weight, it is not easy to bring both molecular weight and polydispersity (i.e., molecular weight distribution) into the desired range. In particular, the physical properties of polyalkylene oxide depends on its molecular weight and polydispersity. In addition to this, if the polyalkylene oxide is in an aqueous solution state, even if the viscosity is the same, its properties will vary when the polydispersity of the polyalkylene oxide is different.

From this point of view, in order to stably exhibit the properties of polyalkylene oxide, it is extremely important to control not only the molecular weight of polyalkylene oxide, but also the polydispersity thereof. This facilitates the application of polyalkylene oxide in the desired use. Accordingly, it has been desired to establish a technology that can produce a polyalkylene oxide having a molecular weight and polydispersity controlled in the desired range by a simple method.

The present disclosure was made in view of the above, and aims to provide a production method that is capable of obtaining a polyalkylene oxide having a molecular weight and polydispersity controlled in the desired range by a simple method.

Solution to Problem

As a result of extensive research to achieve the above object, the present inventors found that the above object can be achieved by synthesizing a high-molecular-weight polyalkylene oxide with a specific viscosity by limiting the amount of a chain transfer agent to a certain amount or by not using a chain transfer agent, and irradiating the high-molecular-weight polyalkylene oxide with radiation. The present invention was thus accomplished.

Specifically, the present disclosure includes the subject matter described in the following items.

Item 1

A method for producing a polyalkylene oxide, comprising
step 1 of performing a polymerization reaction of an alkylene oxide in the presence or absence of a chain transfer agent to obtain a high-molecular-weight polyalkylene oxide; and
step 2 of irradiating the high-molecular-weight polyalkylene oxide obtained in step 1 with radiation to obtain a polyalkylene oxide;
wherein
the amount of the chain transfer agent when used is less than 300 mass ppm relative to the alkylene oxide, and
the high-molecular-weight polyalkylene oxide has a viscosity in a 1 mass % aqueous solution of 7500 mPa·s or more.

Item 2

The method for producing a polyalkylene oxide according to Item 1, wherein the chain transfer agent comprises an alcohol compound.

Item 3

The method for producing a polyalkylene oxide according to Item 1, wherein the alcohol compound is at least one member selected from the group consisting of methanol, ethanol, n-propanol, isopropanol, n-butanol, isobutanol, and t-butanol.

Item 4

The method for producing a polyalkylene oxide according to Item 2, wherein the alcohol compound is at least one member selected from the group consisting of methanol, ethanol, n-propanol, isopropanol, n-butanol, isobutanol, and t-butanol.

Item 5

The method for producing a polyalkylene oxide according to Item 1, wherein the polyalkylene oxide obtained in step 2 has a mass average molecular weight of 100000 to 2500000, and a polydispersity of 5 or less.

Item 6

The method for producing a polyalkylene oxide according to Item 2, wherein the polyalkylene oxide obtained in step 2 has a mass average molecular weight of 100000 to 2500000, and a polydispersity of 5 or less.

Item 7

The method for producing a polyalkylene oxide according to Item 3, wherein the polyalkylene oxide obtained in step 2 has a mass average molecular weight of 100000 to 2500000, and a polydispersity of 5 or less.

Item 8

The method for producing a polyalkylene oxide according to Item 4, wherein the polyalkylene oxide obtained in step 2 has a mass average molecular weight of 100000 to 2500000, and a polydispersity of 5 or less.

Advantageous Effects of Invention

According to the method for producing a polyalkylene oxide of the present disclosure, a polyalkylene oxide whose molecular weight and polydispersity are controlled in the desired range can be obtained by a simple method.

DESCRIPTION OF EMBODIMENTS

Embodiments of the present disclosure are described in detail below. In the present specification, the terms "comprising" and "containing" include "comprising," "containing," "consisting essentially of," and "consisting of."

In the numerical range described in stages in the present specification, the upper or lower limit of the numerical range at one stage can be optionally combined with the upper or lower limit of the numerical range at another stage. In the numerical range described in the present specification, the upper or lower limit of the numerical range may be replaced with a value shown in the Examples, or a value that can be uniquely derived from the Examples. Further, in the present specification, the numerical values connected by the term "to" mean the numerical range including the numerical values before and after the term "to" as the lower limit value and the upper limit value.

The method for producing a polyalkylene oxide of the present disclosure comprises the following steps 1 and 2.
- step 1: the step of performing a polymerization reaction of an alkylene oxide in the presence or absence of a chain transfer agent to obtain a high-molecular-weight polyalkylene oxide; and
- step 2: the step of irradiating a high-molecular-weight polyalkylene oxide obtained in step 1 with radiation to obtain a polyalkylene oxide.

In step 1, the amount of the chain transfer agent when used is less than 300 mass ppm relative to the alkylene oxide, and the high-molecular-weight polyalkylene oxide has a viscosity in a 1 mass % aqueous solution of 7500 mPa·s or more.

The production method comprises at least steps 1 and 2; accordingly, the polyalkylene oxide obtained by the above production method has a molecular weight (in particular, a mass average molecular weight) controlled in the medium-molecular-weight range, and a polydispersity (i.e., molecular weight distribution) controlled in the desired range. In particular, a medium-molecular-weight polyalkylene oxide having a low polydispersity can be produced. Specifically, according to the above production method, a polyalkylene oxide having a low polydispersity although it has a medium molecular weight can be obtained by a simple method.

The polyalkylene oxide obtained by the production method comprising steps 1 and 2 above can be referred to as "medium-molecular-weight polyalkylene oxide" in order to distinguish it from the high-molecular-weight polyalkylene oxide obtained in step 1.

Step 1

Step 1 is a step of performing a polymerization reaction of alkylene oxide in the presence or absence of a chain transfer agent to obtain a high-molecular-weight polyalkylene oxide. The high-molecular-weight polyalkylene oxide obtained in step 1 has a higher molecular weight than the desired polyalkylene oxide, and a precursor of the desired medium-molecular-weight polyalkylene oxide.

Examples of the alkylene oxide used in step 1 include aliphatic alkylene oxides. Specific examples include ethylene oxide, propylene oxide, and butylene oxide. The alkylene oxides used in step 1 can be used alone or in a combination of two or more. The alkylene oxide used in step 1 preferably contains at least ethylene oxide or propylene oxide, and more preferably ethylene oxide. It is also preferable that the alkylene oxide consists of ethylene oxide alone.

In step 1, the polymerization reaction of alkylene oxide can be performed in the presence of a chain-transfer agent, or the polymerization reaction of alkylene oxide can be performed in the absence of a chain-transfer agent, i.e., without using a chain transfer agent.

When a chain transfer agent is used in step 1, the type of the chain transfer agent is not particularly limited. For example, a known chain transfer agent used in the polymerization reaction of alkylene oxide can be used. If the chain transfer agent is used in step 1, the chain transfer agent preferably contains an alcohol compound. In this case, the mass average molecular weight of the obtained medium-molecular-weight polyalkylene oxide can be easily adjusted; moreover, the polydispersity can be easily controlled to the desired range. One or more chain transfer agents can be used. For example, when the chain transfer agent contains an alcohol compound, the proportion of the alcohol compound to the total mass of the chain transfer agent is 50 mass % or more, preferably 80 mass % or more, more preferably 90 mass % or more, and even more preferably 95 mass % or more. The chain transfer agent may be an alcohol compound alone.

The type of the alcohol compound is not particularly limited as long as the alcohol has the property of functioning as a chain transfer agent. The alcohol compound may be, for example, at least one member selected from the group consisting of methanol, ethanol, n-propanol, isopropanol, n-butanol, isobutanol, and t-butanol.

Of these, the alcohol compound is preferably at least one member selected from the group consisting of isopropanol and t-butanol. In this case, the polydispersity can be particularly easily controlled, while the mass average molecular weight of the obtained medium-molecular-weight polyalkylene oxide is in the medium range.

If the polymerization reaction is performed using a chain transfer agent in step 1, the chain transfer agent is used in the range of less than 300 mass ppm relative to the alkylene oxide. Alternatively, no chain transfer agent is used in the polymerization reaction in step 1 (specifically, the amount of the chain transfer agent is 0 mass ppm). This can reduce the polydispersity of the medium-molecular-weight polyalkylene oxide.

When the polymerization reaction is performed using a chain transfer agent in step 1, the amount of the chain transfer agent is 280 mass ppm or less, more preferably 260 mass ppm or less, even more preferably 250 mass ppm or less, and particularly preferably 240 mass ppm or less, relative to the alkylene oxide.

The polymerization reaction in step 1 can be performed in a solvent. The solvent can be, for example, the same as those used in the well-known polymerization reaction of alkylene oxide. Examples of the solvent include aliphatic hydrocarbon solvents. Aliphatic hydrocarbons having a carbon number of 5 to 8 are preferred from the viewpoint of reducing the residual solvent after drying. Examples of aliphatic hydrocarbon solvents include 2-methylbutane, n-pentane, 2-methylpentane, n-hexane, cyclohexane, and n-heptane.

In the polymerization reaction in step 1, the amount of the solvent is not particularly limited. It is preferably 300 parts by mass or more, more preferably 400 parts by mass or more, or preferably 600 parts by mass or less, and more preferably 500 parts by mass or less, relative to 100 parts by mass of the alkylene oxide to be used.

In the polymerization reaction in step 1, the catalyst can be used as necessary. The type of the catalyst is not particularly limited, and can be, for example, the same as those used in the well-known polymerization reaction of alkylene oxide. Specifically, metal catalysts such as zinc can be used. The amount of the catalyst used is not particularly limited. It can be, for example, in the same range as in the known production method of polyalkylene oxide, and specifically about the catalyst quantity.

In the polymerization reaction in step 1, other than the above, various additives can be used as necessary. Examples include an antioxidant, dispersion stabilizer, and the like.

The method of the polymerization reaction in step 1 is not particularly limited. For example, the method used for the known polymerization reaction of alkylene oxide can be used. The temperature of the polymerization reaction is, for example, 30 to 70° C., preferably 30 to 60° C., and more preferably 35 to 50° C. The time for the polymerization reaction can be set according to the heating temperature; it is, for example, about 1 to 5 hours.

The high-molecular-weight polyalkylene oxide is produced by the polymerization reaction performed in step 1. The obtained high-molecular-weight polyalkylene oxide can be separated by a suitable method. For example, the solvent used in the polymerization reaction is removed to separate a high-molecular-weight polyalkylene oxide as a solid.

The high-molecular-weight polyalkylene oxide obtained in step 1 has a viscosity in a 1 mass % aqueous solution of 7500 mPa·s or more. By subjecting such a high-molecular-weight polyalkylene oxide having a viscosity in a 1 mass % aqueous solution to step 2, the polydispersity can be reduced while the mass average molecular weight of the medium-molecular-weight polyalkylene oxide is adjusted to the desired range.

The viscosity in a 1 mass % aqueous solution of the high-molecular-weight polyalkylene oxide is a value measured by the following method. 6 g of a polyethylene oxide and 125 mL of isopropanol are added to a 1 L beaker. While the mixture is stirred at 300 to 400 rpm using a stirring blade, 594 g of ion-exchange water is added, followed by stirring for one minute. Subsequently, the stirring speed is changed to 60 rpm, and stirring is continued for an additional 3 hours to obtain a 1% aqueous solution of polyethylene oxide. The aqueous solution is kept at 25° C., and the viscosity is measured using a rotational viscometer (Brookfield "RVDV-II+"). The obtained value is referred to as a viscosity in a 1% aqueous solution.

The viscosity in a 1 mass % aqueous solution of the high-molecular-weight polyalkylene oxide is preferably 7500 mPa·s or more, and more preferably 9000 mPa·s or more. The upper limit of the viscosity in a 1 mass % aqueous solution of the high-molecular-weight polyalkylene oxide is, for example, 16000 mPa·s.

Step 2

Step 2 is a step for irradiating the high-molecular-weight polyalkylene oxide obtained in step 1 with radiation. By step 2, a medium-molecular-weight polyalkylene oxide, i.e., the desired polyalkylene oxide, can be obtained.

The type of radiation is not particularly limited. For example, gamma ray, X-ray, neutron ray, or the like can be used. Of these, gamma ray can be preferably used. For example, if gamma ray is used, the irradiation conditions are not particularly limited. The high-molecular-weight polyalkylene oxide is irradiated with gamma ray of 0.4 kGy or more. In this case, the mass average molecular weight of the obtained medium-molecular-weight polyalkylene oxide can be adjusted to the desired range, and the polydispersity can be reduced.

Regarding the irradiation dose of the gamma ray to be irradiated is, for example, gamma ray having a suitable radiation dose depending on the type of the polyalkylene oxide. When the irradiation of gamma ray having a relatively low radiation dose is sufficient, the gamma-ray irradiation dose is, for example, preferably 0.5 kGy or more, more preferably 0.6 kGy or more, even more preferably 0.7 kGy or more, and particularly preferably 0.8 kGy or more. The gamma-ray irradiation dose is preferably 30 kGy or less. The irradiation duration of radiation is not particularly limited, and can be suitably set according to the type of radiation. The irradiation of radiation can be performed, for example, using a known radiation irradiation apparatus.

The method for emitting radiation in step 2 is not particularly limited. For example, a high-molecular-weight polyalkylene oxide in a solid state, such as powder, can be irradiated with radiation, or a high-molecular-weight polyalkylene oxide in a solution state can be irradiated with radiation. To emit radiation, the high-molecular-weight polyalkylene oxide can be contained in a space surrounded by a suitable material that does not block radiation, such as polyethylene, PET, aluminum bags, and cardboard.

Irradiation of radiation in step 2 causes cleavage or the like of the high-molecular-weight polyalkylene oxide to produce the desired medium-molecular-weight polyalkylene oxide. After irradiation of radiation, appropriate post-treatment, e.g., drying, curing, grinding, refining, and other various treatments, can also be carried out as necessary.

Medium-Molecular-Weight Polyalkylene Oxide

The medium-molecular-weight polyalkylene oxide obtained by the production method comprising step 1 and step 2 above preferably has a mass average molecular weight of 100000 to 2500000. This facilitates the control of the drug dissolution rate when the medium-molecular-weight polyalkylene oxide is used for a solid dosage form. The mass average molecular weight of the medium-molecular-weight polyalkylene oxide is more preferably 600000 or more, even more preferably 900000 or more, and particularly preferably 1000000 or more. The mass average molecular weight of the medium-molecular-weight polyalkylene oxide is more preferably 2500000 or less, even more preferably 2400000 or less, and particularly preferably 2300000 or less. The mass average molecular weight of the polyalkylene oxide herein means the value measured by gel permeation chromatography, in particular, the value calculated from a calibration curve prepared using a known polyethylene oxide standard sample.

The medium-molecular-weight polyalkylene oxide preferably has a polydispersity (i.e., value of mass average molecular weight (Mw)/number average molecular weight (Mn)) of 5 or less. This facilitates the control of the drug dissolution rate when the medium-molecular-weight polyalkylene oxide is used for a solid dosage form. The medium-molecular-weight polyalkylene oxide preferably has a polydispersity of 4.5 or less, and more preferably 4.2 or less. The polydispersity of the medium-molecular-weight polyalkylene oxide is more preferably 3 or more, and even more preferably 3.1 or more.

The medium-molecular-weight polyalkylene oxide is usually a homopolymer; however, it is not limited thereto, and may be a copolymer. When the polyalkylene oxide is a copolymer, it, for example, has two or more structural units in which the alkylene moiety has a different carbon atom.

The form of the medium-molecular-weight polyalkylene oxide obtained by the above production method is not particularly limited. The medium-molecular-weight polyalkylene oxide can take various forms, such as powder, granules, lumps, and pellets.

Since the medium-molecular-weight polyalkylene oxide obtained by the above production method has a controlled low polydispersity although the mass average molecular weight is in the medium range, it can be preferably used for applications requiring a polyalkylene oxide with such properties. For example, the medium-molecular-weight polyalkylene oxide obtained by the above production method can be suitably used for a solid dosage form, an aqueous adhesive, or the like.

EXAMPLES

The present disclosure is described in more detail below by means of examples; however, the present disclosure is not limited to the embodiments of the examples.

Production Example 1: Production of Zinc Catalyst

After the inside of a round-bottom flask with an inner diameter of 80 mm and a capacity of 500 mL, equipped with a cooler, a dropping funnel, a nitrogen gas inlet tube, and a stirring blade with four (45° inclined) paddle blades with a blade diameter of 53 mm as a stirrer, was replaced with nitrogen, 87.1 g of n-hexane and 9.90 g of diethylzinc ($Et_2Zn$) were added to this flask. While the inner temperature of the flask was maintained at 20° C., and the inside of the flask was stirred at a tip peripheral speed of 0.97 m/sec (stirring speed: 350 rpm), 11.03 g (0.240 mol) of ethyl alcohol (EtOH) was added dropwise at 0.2 g/min as the first stage to perform a reaction, thus obtaining a reaction solution. Subsequently, as the second stage, a mixture comprising 6.49 g (0.072 mol) of 1,4-butanediol (1,4-BDO) and 13.27 g (0.288 mol) of ethyl alcohol was added dropwise at a rate of 0.2 g/min into the above reaction solution that had been cooled to 10° C. After completion of the dropwise addition, the inside of the flask was increased to 30° C., and then further reacted for 1 hour. Subsequently, the temperature was increased to 50° C. to perform a reaction for 1 hour. Thereafter, by distillation in which the flask was heated to 80° C., an unreacted component was removed. After the distillation, the inside of the flask was allowed to cool to room temperature; then, 52.4 g of n-hexane was added to the flask, followed by heating to 80° C., thus performing the second distillation. This operation was performed one more time, thus performing distillation a total of three times. Thereafter, the resultant was cooled and diluted with 264 g of n-hexane to obtain 297 g of a zinc catalyst with a zinc content of 1.8 mass %.

Production Example 2-1-1: Production of High-Molecular-Weight Polyalkylene Oxide After the inside of a pressure-resistant reaction vessel with an inner diameter of 94 mm and a capacity of 1 L, equipped with a dropping funnel, a nitrogen gas inlet tube, and a stirring blade with an anchor-type paddle blade with a blade diameter of 47 mm as a stirrer, was replaced with nitrogen, 340 g of n-hexane was placed in this pressure-resistant reaction vessel, and 0.975 g (zinc equivalent: 0.0004 mol) of the zinc catalyst obtained in Production Example 1 was uniformly dispersed in this n-hexane to obtain a dispersion. After 81 g (1.84 mol) of ethylene oxide was added to the dispersion, the vessel was tightly closed, and maintained at 40° C. While stirring the mixture, a polymerization reaction was performed. The white product obtained by the polymerization reaction was separated by filtration, followed by drying under reduced pressure at 40° C. to give 81.0 g of a high-molecular-weight polyethylene oxide. The viscosity in a 1% aqueous solution of the obtained high-molecular-weight polyalkylene oxide was 13520 mPa·s.

Production Example 2-1-2: Production of High-Molecular-Weight Polyalkylene Oxide 81.0 g of a high-molecular weight polyethylene oxide was obtained in the same manner as in Production Example 2-1-1. The viscosity in a 1% aqueous solution of the high-molecular-weight polyalkylene oxide was 12400 mPa·s.

Production Example 2-2: Production of High-Molecular-Weight Polyalkylene Oxide

After the inside of a pressure-resistant reaction vessel with an inner diameter of 94 mm and a capacity of 1 L, equipped with a dropping funnel, a nitrogen gas inlet tube, and a stirring blade with an anchor-type paddle blade with a blade diameter of 47 mm as a stirrer, was replaced with nitrogen, 340 g of n-hexane was placed in this pressure-resistant reaction vessel, and 0.975 g (zinc equivalent: 0.0004 mol) of the zinc catalyst obtained in Production Example 1 was uniformly dispersed in this n-hexane to obtain a dispersion. After 0.0162 g (0.00027 mol) of iso-propanol and 81 g (1.84 mol) of ethylene oxide were added to the dispersion, the vessel was tightly closed, and maintained at 40° C. While stirring the mixture, a polymerization reaction was performed. In the polymerization reaction, the amount of the chain transfer agent was 200 mass ppm relative to ethylene oxide. The white product obtained by the polymerization reaction was separated by filtration, followed by drying under reduced pressure at 40° C. to give 81.0 g of a high-molecular-weight polyethylene oxide. The viscosity in a 1% aqueous solution of the high-molecular-weight polyalkylene oxide was 11100 mPa·s.

Production Example 2-3: Production of High-Molecular-Weight Polyalkylene Oxide 81.0 g of a high-molecular-weight polyethylene oxide was obtained in the same manner as in Production Example 2-2, except that the chain transfer agent was changed to t-butanol and the amount was changed to about 236 mass ppm relative to ethylene oxide. The viscosity in a 1% aqueous solution of the obtained high-molecular-weight polyalkylene oxide was 7720 mPa·s.

Production Example 2-4: Production of High-Molecular-Weight Polyalkylene Oxide 81.0 g of a high-molecular-weight polyethylene oxide was obtained in the same manner as in Production Example 2-2, except that the amount of the chain transfer agent was changed to about 2500 mass ppm relative to ethylene oxide. The viscosity in a 1% aqueous solution of the high-molecular-weight polyalkylene oxide was 5800 mPa·s.

Production Example 2-5: Production of High-Molecular-Weight Polyalkylene Oxide 81.0 g of a high-molecular-weight polyethylene oxide was obtained in the same manner as in Production Example 2-2, except that the chain transfer agent was changed to t-butanol and the amount was changed to about 818 mass ppm relative to ethylene oxide. The viscosity in a 1% aqueous solution of the obtained high-molecular-weight polyalkylene oxide was 3200 mPa·s.

Example 1

By irradiating 40.0 g of the high-molecular-weight polyethylene oxide obtained in Production Example 2-1-1 with 0.8 kGy of gamma ray, 40.0 g of the desired medium-molecular-weight polyethylene oxide was obtained. Gamma-ray irradiation was performed with high-molecular-weight polyethylene oxide powder contained in a nylon/low-density polyethylene bag, and Cobalt 60 gamma irradiation facility No. 1 (RIC1), produced by Radia Industry Co., Ltd., was used as an irradiation apparatus.

Example 2

40.0 g of the desired medium-molecular-weight polyethylene oxide was obtained in the same manner as in Example 1, except that 0.9 kGy of gamma ray was emitted.

Example 3

By irradiating 40.0 g of the high-molecular-weight polyethylene oxide obtained in Production Example 2-1-2 with 3.2 kGy of gamma ray, 40.0 g of the desired medium-molecular weight polyethylene oxide was obtained.

Example 4

40.0 g of the desired medium-molecular-weight polyethylene oxide was obtained in the same manner as in Example 3, except that 27.0 kGy of gamma ray was emitted.

Example 5

By irradiating 40.0 g of the high-molecular-weight polyethylene oxide obtained in Production Example 2-2 with 0.8 kGy of gamma ray, 40.0 g of the desired medium-molecular-weight polyethylene oxide was obtained.

Example 6

40.0 g of the desired medium-molecular-weight polyethylene oxide was obtained in the same manner as in Example 5, except that 0.9 kGy of gamma ray was emitted.

Example 7

By irradiating 40.0 g of the high-molecular-weight polyethylene oxide obtained in Production Example 2-3 with 2.4 kGy of gamma ray, 40.0 g of the desired medium-molecular weight polyethylene oxide was obtained.

Example 8

40.0 g of the desired medium-molecular-weight polyethylene oxide was obtained in the same manner as in Example 7, except that 20.0 kGy of gamma ray was emitted.

Comparative Example 1

By irradiating 40.0 g of the high-molecular-weight polyethylene oxide obtained in Production Example 2-4 with 0.6 kGy of gamma ray, 40.0 g of the desired medium-molecular-weight polyethylene oxide was obtained.

Comparative Example 2

40.0 g of the desired medium-molecular-weight polyethylene oxide was obtained in the same manner as in Comparative Example 1, except that 0.7 kGy of gamma ray was emitted.

Comparative Example 3

By irradiating 40.0 g of the high-molecular-weight polyethylene oxide obtained in Production Example 2-5 with 5.0 kGy of gamma ray, 40.0 g of the desired medium-molecular-weight polyethylene oxide was obtained.

Comparative Example 4

40.0 g of the desired medium-molecular-weight polyethylene oxide was obtained in the same manner as in Comparative Example 1, except that 8.0 kGy of gamma ray was emitted.

TABLE 1

| Example/Comparative Example | Chain transfer agent (ppm) | Viscosity in a 1% aqueous solution of high-molecular-weight polyethylene oxide (mPas) | Gamma ray irradiation amount (kGy) | Medium-molecular-weight polyethylene oxide | | |
|---|---|---|---|---|---|---|
| | | | | Mw | Mn | Mw/Mn polydispersity |
| Example 1 | 0 | 13520 | 0.8 | 1936620 | 624014 | 3.1 |
| Example 2 | 0 | 13520 | 0.9 | 1626898 | 390801 | 4.2 |
| Example 3 | 0 | 12400 | 3.2 | 1241492 | 338731 | 3.7 |
| Example 4 | 0 | 12400 | 27.0 | 165376 | 44970 | 3.7 |
| Example 5 | 200 | 11100 | 0.8 | 1917854 | 467769 | 4.1 |
| Example 6 | 200 | 11100 | 0.9 | 1580953 | 376417 | 4.2 |
| Example 7 | 236 | 7720 | 2.4 | 1019966 | 251132 | 4.1 |
| Example 8 | 236 | 7720 | 20.0 | 181439 | 51835 | 3.5 |
| Comparative Example 1 | 2500 | 5800 | 0.6 | 2391040 | 246762 | 9.7 |
| Comparative Example 2 | 2500 | 5800 | 0.7 | 2058456 | 226204 | 9.1 |
| Comparative Example 3 | 818 | 3200 | 5.0 | 179645 | 23456 | 7.7 |
| Comparative Example 4 | 818 | 3200 | 8.0 | 175465 | 22513 | 7.8 |

Table 1 shows the measurement results of the mass average molecular weight (Mw), number average molecular weight (Mn), and polydispersity (Mw/Mn) of a medium-molecular-weight polyethylene oxide obtained in each of the Examples and Comparative Examples. The results of Table 1 indicate that by treating with gamma ray the high-molecular-weight polyalkylene oxide having a viscosity of 7500 mPa·s or more in a 1 mass % aqueous solution, which was obtained in the polymerization reaction in the absence of a chain transfer agent, a medium-molecular-weight polyalkylene oxide that had a polydispersity of 5 or less although it had a medium molecular weight was generated. Table 1 also indicates that by obtaining a high-molecular-weight polyalkylene oxide having a viscosity in a 1 mass % aqueous solution of 7500 mPa·s or more, in which the amount of the chain transfer agent was set to less than 300 mass ppm relative to the alkylene oxide, and treating the high-molecular-weight polyalkylene oxide with gamma ray, a medium-molecular-weight polyalkylene oxide that had a polydispersity of 5 or less although it had a medium molecular weight was generated.

The following methods were used for various evaluation methods.

Mass Average Molecular Weight and Polydispersity

The mass average molecular weight and polydispersity of polyethylene oxide were measured by gel permeation chromatography. Specifically, 0.02 g of polyethylene oxide was added to 40 mL of a 0.19M sodium nitrate aqueous solution, followed by dissolution for 3 hours to obtain a solution. The solution was filtered through a 0.8 μm membrane filter, and the obtained filtrate was analyzed by gel permeation chromatography (HLC-8220GPC produced by Tosoh Corporation, guard column: TSKgel guardcolumn PWXL). In this measurement, TSKgel G6000PWXL, TSKgel GMPWXL, and TSKgel G3000PWXL were used as size exclusion columns; the mobile phase was a 0.20 M sodium nitrate aqueous solution; the flow rate was 0.5 mL/min; the column temperature was 40° C.; the differential refractometer temperature was 40° C.; the injection volume was 500 μL; and the measurement time was 90 minutes. Separately, by using a polyethylene oxide standard sample having a known weight average molecular weight, number average molecular weight, and polydispersity, the measurement was performed in a similar manner to form a calibration curve, and the mass average molecular weight, number average molecular weight, and polydispersity of polyethylene oxides having a Log M in the range of 3.5 to 7.2 were calculated based on the calibration curve.

Viscosity in 1% Aqueous Solution 6 g of a polyethylene oxide and 125 mL of isopropanol were added to a 1 L beaker, and 594 g of ion exchange water was added under stirring the mixture at 300 to 400 rpm using a stirring blade, followed by stirring for one minute. Thereafter, the stirring speed was changed to 60 rpm, and the stirring was continued for an additional 3 hours to obtain an aqueous solution of 1% polyethylene oxide. The aqueous solution was maintained at 25° C., and the viscosity was measured using a rotational viscometer (Brookfield "RVDV-II+"). This value was defined as the viscosity in a 1% aqueous solution.

The invention claimed is:

1. A method for producing a polyethylene polyalkylene oxide, comprising
    step 1 of performing a polymerization reaction of an ethylene oxide in the presence or absence of a chain transfer agent to obtain a high-molecular-weight polyethylene oxide; and
    step 2 of irradiating the high-molecular-weight polyethylene oxide obtained in step 1 with radiation to obtain a polyethylene oxide;
    wherein
    the amount of the chain transfer agent when used is less than 300 mass ppm relative to the ethylene oxide, and
    the high-molecular-weight polyethylene oxide obtained in step 1 has a viscosity at 25° C. in a 1 mass % aqueous solution of 7500 mPa·s or more,
    the viscosity at 25° C. in a 1 mass % aqueous solution of the high-molecular-weight polyethylene oxide being a value measured by the following method: 6 g of the high-molecular-weight polyethylene oxide and 125 mL of isopropanol are added to a 1 L beaker; while the mixture is stirred at 300 to 400 rpm using a stirring blade, 594 g of ion-exchange water is added, followed by stirring for one minute; subsequently, the stirring speed is changed to 60 rpm, and stirring is continued for an additional 3 hours to obtain a 1% aqueous solution of polyethylene oxide; the aqueous solution is kept at 25° C., and the viscosity is measured using a rotational viscometer; and the obtained value is referred to as the viscosity at 25° C. in a 1% aqueous solution.

2. The method for producing a polyethylene oxide according to claim 1, wherein the chain transfer agent comprises an alcohol compound.

3. The method for producing a polyethylene polyalkylene oxide according to claim 2, wherein the alcohol compound is at least one member selected from the group consisting of methanol, ethanol, n-propanol, isopropanol, n-butanol, isobutanol, and t-butanol.

4. The method for producing a polyethylene oxide according to claim 1, wherein the polyethylene oxide obtained in step 2 has a mass average molecular weight of 100000 to 2500000, and a polydispersity of 5 or less.

5. The method for producing a polyethylene oxide according to claim 2, wherein the polyethylene oxide obtained in step 2 has a mass average molecular weight of 100000 to 2500000, and a polydispersity of 5 or less.

6. The method for producing a polyethylene oxide according to claim 3, wherein the polyethylene oxide obtained in step 2 has a mass average molecular weight of 100000 to 2500000, and a polydispersity of 5 or less.

* * * * *